US007015912B2

(12) United States Patent
Marais

(10) Patent No.: US 7,015,912 B2
(45) Date of Patent: Mar. 21, 2006

(54) SYSTEM AND METHOD FOR THE VISUAL DISPLAY OF DATA IN AN INTERACTIVE ZEBRA CHART

(75) Inventor: Johannes L. Marais, Mountain View, CA (US)

(73) Assignee: Vendavo, Inc., Palo Alto, CA (US)

( * ) Notice: Subject to any disclaimer, the term of this patent is extended or adjusted under 35 U.S.C. 154(b) by 51 days.

(21) Appl. No.: 10/341,744

(22) Filed: Jan. 13, 2003

(65) Prior Publication Data

US 2004/0135782 A1  Jul. 15, 2004

(51) Int. Cl.
  G09G 5/22  (2006.01)
(52) U.S. Cl. .................................... 345/440.2
(58) Field of Classification Search ........... 345/440, 345/440.2
  See application file for complete search history.

(56) References Cited

U.S. PATENT DOCUMENTS

| | | | |
|---|---|---|---|
| 3,806,711 A | 4/1974 | Cousins, Jr. | |
| 5,053,957 A | 10/1991 | Suzuki | |
| 5,224,034 A | 6/1993 | Katz et al. | |
| 5,670,984 A | 9/1997 | Robertson et al. | 345/139 |
| 5,689,287 A | 11/1997 | Mackinlay et al. | 345/427 |
| 5,740,448 A | 4/1998 | Gentry et al. | 395/726 |
| 5,878,400 A | 3/1999 | Carter, III | |
| 6,320,586 B1 | 11/2001 | Plattner et al. | 345/441 |
| 6,812,926 B1 * | 11/2004 | Rugge | 345/440 |
| 2003/0195810 A1 | 10/2003 | Raghupathy et al. | |
| 2003/0200185 A1 | 10/2003 | Huerta et al. | |

FOREIGN PATENT DOCUMENTS

WO  WO 99/60486  11/1999

OTHER PUBLICATIONS

Marn and Rosiello, "Managing Price Gaining Profit," *Harvard Business Review*, pp. 84-93 (Sep.-Oct. 1992).

* cited by examiner

Primary Examiner—Ryan Yang
(74) Attorney, Agent, or Firm—Kang Lim

(57) ABSTRACT

A computer program product for use in conjunction with a computer system. The computer program displays all the information that is conventionally displayed in a plurality of pie charts in a single novel chart form. When applicable, this novel chart form can also display positively contributing components and negatively contributing components in the same chart. The chart comprises a plurality of bars and each bar in the plurality of bars comprises a plurality of linearly ordered components. For each bar in the chart, the program includes instructions for patterning each component in the bar in a way that visually differentiates it from components in the bar that border the component.

19 Claims, 4 Drawing Sheets

SYSTEM AND METHOD FOR THE VISUAL DISPLAY OF DATA IN AN INTERACTIVE ZEBRA CHART

The present invention relates generally to the display of data, and particularly to the display of data using a computer.

BACKGROUND OF THE INVENTION

Numerical information can be displayed in a variety of ways, each of which is suited for displaying a particular type or quantity of data. Many options are available for presenting data, especially with the advent of word processors, spreadsheets, and graphics software programs for creating tables and graphs.

In order to communicate information decisions effectively to users, designers need to understand the tasks in which readers engage when they look at displays. Because the user's tasks require certain sensory, perceptual and cognitive operations, one has to consider what type of information the user is trying to ascertain in reading the graph. For example, a well-designed line graph makes it easier to discern the slopes of lines, whereas, if the user's goal is to determine actual values at certain points, differentiating slopes is of little value.

There are various factors in making a decision about how to present data. The first factor concerns the amount of data being presented. When presenting a small amount of data, authors should weigh the communicative benefits of tabular or graphical presentation against the reader's cognitive costs. Generally, in this case, tabular presentation is preferred. However, with a large amount of data, the reader's use of the data, especially the degree of precision the reader is likely to need, becomes important. When relations are more important than precise values, the data is probably best displayed in a graph.

Finally, one must then choose the type of graph to present the information. This decision depends on both the characteristics of the readers and of independent and dependent variables. Generally, common graphs with which all readers are likely to have experience are used: line graphs, bar graphs, pie charts, and scatter plots. The choice of graph type depends on the readers' informational needs. Either a line graph or a bar graph is used if readers need to determine relative or absolute amounts. A line graph is used, for example, when a user needs to determine the rate of increase of a dependent (criterion) variable as a function of change in an independent (predictor) variable. A bar graph is used when a user needs to determine the difference between the means of the dependent variable across different levels of the independent variable. A pie chart is commonly used when a user needs to determine primarily proportions but not absolute amounts. However, the type of information each of these graph types can convey is limited. For example, a pie chart can only display one aspect of an underlying data set. If the underlying data set consists of two aspects, company profits as well as company losses, two pie charts are required. One for the company profits and one for the company losses.

Thus, given the above background, what is needed in the art are improved systems and methods for displaying data.

SUMMARY OF THE INVENTION

The present invention provides improved systems and methods for displaying data. In the present invention, data is presented in a novel graph form entitled the zebra chart. An additional advantage of the present invention is that the novel graph forms of the present invention are interactive. That is, by passing a mouse over components of the present invention, additional information associated with the component of the graph is provided. One embodiment of the present invention provides a computer program product for use in conjunction with a computer system. The computer program product comprises a computer readable storage medium and a computer program mechanism embedded therein. The computer program mechanism comprises a chart generator module and a chart display module. In some embodiments, the chart generator module and the chart display module are in a single program module. In some embodiments, the computer program product further comprises the data source.

The chart generator module includes instructions for reading a data source and instructions for generating a chart. The chart comprises a plurality of bars. Each bar in the plurality of bars comprises a plurality of linearly ordered components. The chart display module includes instructions for displaying the chart on an output device such that, for each bar in the chart, each component in the bar is depicted in a pattern that differs from components in the same bar that border the component.

In some embodiments, each odd component in the plurality of components in a bar in the chart is displayed in a first pattern and each even component in the plurality of components in the bar is displayed in a second pattern, where the first pattern and the second pattern are different. For example, the first pattern could be solid shading in a first color and the second pattern could be solid shading in a second color. In another example, the first pattern is a first hash pattern and the second pattern is a second hash pattern.

In some embodiments, each $(1+3\times Y)$ component in the plurality of components in a bar in the chart is displayed in a first pattern. Furtermore, each $(2+3\times Y)$ component in the plurality of components in the bar is displayed in a second pattern. Finally, each $(3+3\times Y)$ component in the plurality of components in the bar is displayed in a third pattern. Here, Y is zero or a positive integer and each of the first pattern, the second pattern and the third pattern is different. In one example in accordance with such embodiments, the first pattern is solid shading in a first color, the second pattern is solid shading in a second color, and the third pattern is solid shading in a third color.

More generally, the present invention provides a bar in the chart. And, for each integer s in a set of integers S, where the set S consists of the integers 1 to M, each $s+M\times Y$ component in the plurality of components in a bar in said chart is displayed in an $s^{th}$ pattern. Each $s^{th}$ pattern is different from any other pattern used to display a component in the same bar. Further, Y has a value of zero or any positive integer, and M has a value of two or greater.

In some embodiments, more than two patterns can be used to display the components of a bar in the chart. In the general case of M shading patterns numbered zero to M-1, and where the components of the bar are linearly numbered from zero to N-1, where N is the total number of components of a particular bar in the chart, the shading pattern of component number I, where $0 \leq I < N$ of the bar is number I MOD M, where MOD denotes the remainder or modulus operator of numerical division.

In some embodiments, the chart generator module includes instructions for ordering the plurality of components in a bar in the chart based on a criterion. In such embodiments, the chart display module comprises instructions for displaying the plurality of components in the bar in the chart based on this ordering. In one example, the criterion used for ordering the components is a magnitude associated with the component.

In some embodiments of the present invention, the chart generator module comprises instructions, for each component in a plurality of components in a bar in the chart, for scaling a length of the component based on an amount that the component contributes to the bar. In some embodiments, a component in a bar in the chart that contributes the most to a bar is closest to an axis of the chart. In some embodiments, a component in a bar in said chart that contributes the least to said bar is closest to an axis of the chart. In some embodiments of the present invention, the chart display module comprises instructions for displaying the plurality of bars in a horizontal fashion or a vertical fashion on the output device.

In some embodiments, the chart display module comprises instructions for sensing when a cursor is overlaid on a component in the chart and instructions for displaying a label (e.g., a tooltip) associated with said component when said cursor is overlaid on said component.

In some embodiments, the chart generator module comprises instructions for ordering the plurality of bars in the chart using a criterion and the chart display module comprises instructions for displaying the plurality of bars in the chart using this ordering.

In one aspect of the invention, at least one component in a plurality of components in a bar in the chart has a positive value and at least one component in the plurality of components in the bar has a negative value. In embodiments in accordance with this aspect of the invention, the display module comprises instructions for displaying each component in the bar that has a positive value on a first side of an axis in the chart. Furthermore, the display module comprises instructions for displaying each component in the bar that has a negative value on a second side of the axis.

Another aspect of the present invention provides a computer system for plotting a chart. The computer system comprises a central processing unit, an output device, and a memory that is coupled to the central processing unit. The memory stores a data source. The data source includes a plurality of dimensions and each dimension has a plurality of components. The computer system further comprises a chart generator module that is executable by the central processing unit. The chart generator module includes instructions for reading the data source and instructions for generating the chart. The chart comprises a plurality of bars and each bar in the plurality of bars comprises a plurality of linearly ordered components.

In this aspect of the invention, the computer system further comprises a chart display module that is executable by the central processing unit. The chart display module includes instructions for displaying the chart on the output device such that, for each bar in the chart, each component in the bar is depicted in a pattern that differs from components in the bar that border the component.

BRIEF DESCRIPTION OF THE DRAWINGS

The features and advantages of the present invention will become apparent from the following detailed description of the present invention in which.

Like referenced numerals refer to corresponding parts throughout the several views of the drawings.

DETAILED DESCRIPTION OF THE INVENTION

Figure 1:
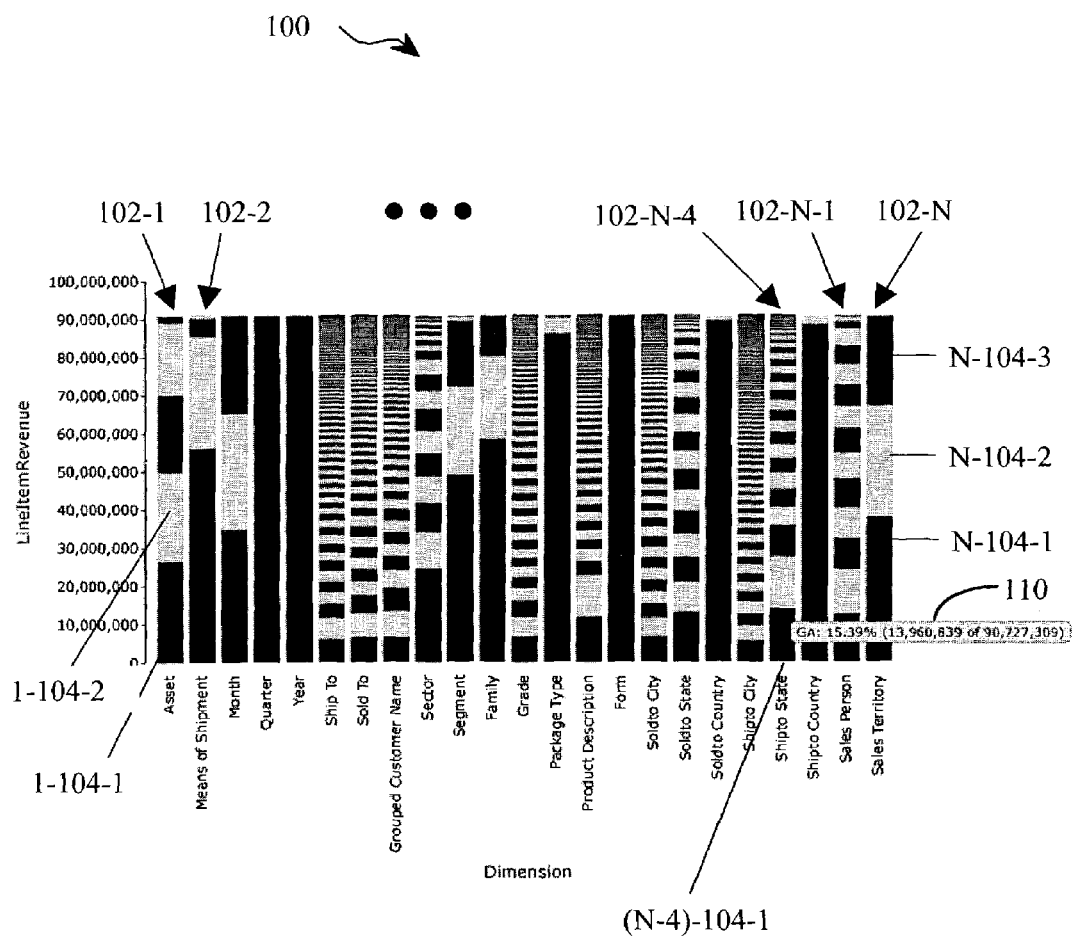
FIG. 1 illustrates an exemplary zebra chart in accordance with one embodiment of the present invention.

The present invention may advantageously be used to display information that is conventionally described in a plurality of pie charts, where each pie chart breaks down the components that contribute to some total value (e.g., a first pie chart displaying quarterly revenue for company X broken down by salesperson, a second pie chart displaying quarterly revenue for company X broken down by geographic regions, etc.). The present invention displays all the information that is conventionally displayed in a plurality of pie charts in a single novel chart form. This novel chart form has the further advantage that both positively contributing components and negatively contributing components can be displayed as described in further detail below.

The systems and methods of the present invention provide a novel chart form that is termed the "zebra chart". A zebra chart can be used in a wide range of applications in which there is need to visualize data. For example, in an accounting application, a zebra chart can summarize, in one single interactive chart, an individual pricing component (e.g., order size discount, annual volume rebate, freight charge) making up a particular total, sliced over several dimensions (like product, customer, quarter etc.).

To visualize such an example, consider the case in which a company has revenue of ninety million in a particular quarter. In this example, the question of interest is the specific source of the revenue. This is a complex question and the answer will depend on the dimension of interest. One can draw a conventional table or pie chart showing how the revenue breaks down by customer. Alternatively, one can draw a conventional table or pie chart showing it by region or by sales person, and so on. A typical company might have dozens of dimensions of interest. Therefore, to fully analyze the source of the revenue for the company, it would be necessary to plot several types of conventional graphs, each showing a different, very specific aspect of the data. While business intelligence software allows you to set up reports to answer these questions with individual reports, they do not give you a single report summary covering all dimensions.

Thus, in this case, the zebra chart provides a distinct advantage over such conventional business reports. To determine the specific question of what was the source of the revenue, a zebra chart such as the one shown in FIG. 1 can be drawn. Zebra chart 100 (FIG. 1) comprises a sequence of bars 102. In the chart, there are N bars 102. In, practice N can be any number. In some embodiments, N is any number between 1 and 1,000 or more. Each bar 102 represents a different dimension (e.g., grouped customer name, sold to city, sold to state, sales person, sales territory, etc.). Although bars 102 are drawn vertically in zebra chart 100, the zebra charts of the present invention are not so limited. In fact, bars 102 can be plotted horizontally, vertically, or at any orientation on the page. In fact, in some embodiments, each bar is a ray that extends from one or more common points of origin. Thus, there is no requirement in the present invention that each bar 102 be parallel to the other bars 102 in a given zebra chart.

In the example shown in FIG. 1, each bar 102 adds up to one hundred percent for a given dimension. For example, bar 102-N-4 (FIG. 1) represents the "ship to state." That is, bar 102-N-4 represents the total value of the product shipped during the time period represented by the zebra chart.

In the present invention, each bar 102 consists of components 104. Each component 104 represents a defined subset of the dimension represented by a bar 104. For example, in FIG. 1, each component 104 of bar 102-N-4 (ship to state) represents the amount of product shipped to a state in the United States. For example, component (N-4)-104-1 represents the state of Georgia, where a revenue of $13,960,839 was derived during the time period covered by the zebra chart.

An advantage of the present invention is that each given component 104 in a bar 102 is depicted in a pattern that differs from the components 104 that border the given component 104. In one embodiment, this patterning scheme is effected by shading each odd component 104 a first color (e.g., red, green, blue, indigo, or violet) and each even component 104 a different second color (e.g., red, green, blue, indigo, or violet). In the zebra chart illustrated in FIG. 1, for example, each odd component (1, 3, 5, etc.) is shaded black and each even component (2, 4, 6, etc.) is shaded white.

The present invention is not limited to the use of solid color patterns to distinguish neighboring (bordering) components 104 is a given plot. For example, in some embodiments, each odd component 104 in a given bar 102 is hashed in a first pattern (e.g., a horizontal hash) and each even component 104 in a given bar 102 is hashed in a second pattern (e.g., a vertical hash).

The present invention is not limited to periodic patterning schemes in which the interval is two (e.g. odd components colored a first pattern and even components colored a second pattern). For example, some embodiments of the present invention provide a periodic patterning scheme in which the interval is three and:

1+3×Y components are displayed in a first pattern;
2+3×Y components are displayed in a second pattern; and
3+3×Y components are displayed in a third pattern.

In this example, Y is zero or a positive integer and each of the first pattern, the second pattern and the third pattern is different.

More generally, the present invention provides for periodic component 104 patterning schemes having an interval M, such that:

Each 1+M×Y components is displayed in a first pattern;
Each 2+M×Y components is displayed in a second pattern;
- 
- 
-

Each s+M×Y components is displayed in an $M^{th}$ pattern.

In this example, Y is zero or a positive integer. For each integer s in the set S of integers consisting of 1 to M, the periodic patterning scheme provides a patterning rule: each s+M×Y component in the plurality of components in the bar is displayed in an $s^{th}$ pattern and this $s^{th}$ pattern is different from any other pattern used in the display of a component in the same bar. To illustrate, consider the case in which M is 4. Therefore, components 104-1, 104-5, 104-9, . . . , 104-[1+(4×Y)] are displayed in first pattern (e.g., a first hash, a first color, etc.);

components 104-2, 104-6, 104-10, . . . , 104-[2+(4×Y)] are displayed in a second pattern (e.g., a second hash, a second color, etc.);

components 104-3, 104-7, 104-11, . . . , 104-[3+(4×Y)] are displayed in a third pattern (e.g., a third hash, a third color, etc.); and components 104-4, 104-8, 104-12, . . . , 104-[4+(4×Y)] are displayed in a fourth pattern (e.g., a fourth hash, a fourth color, etc.).

In one embodiment of the present invention, movement of a mouse cursor over a component 104 of a bar 102 in the zebra chart shows the value of the component 104 and the total value for the bar 102. For example, in FIG. 1, bar 102-N-4 represents the dimension "ship to state." Each component of bar 102-N-4 represents a state that product has been shipped. When the mouse cursor is moved over component (N-4)-104-1 of bar 102-N, data associated with component (N-4)-104-1 is displayed in a pop-up label. In FIG. 1, this pop-up label is label 110. Label 110 shows, during the time period covered by the zebra chart, (i) the amount of product, in dollars, that was shipped to Georgia, (ii) the percent of product shipped to Georgia relative to the entire United States of America, and (iii) the total amount of product, in dollars.

In the embodiment illustrated in FIG. 1, each component 104 in bar 102-N-4 is sorted by totals, so that states with the highest revenue are closest to the axis. More generally, the present invention provides for a broad array of sorting schemes for sorting components 104. For example, in one embodiment, components 104 in a bar 102 are sorted so that components 104 with the smallest contribution to a bar 102 are closest to the axis (e.g., the x-axis in a vertical zebra chart as in FIG. 1, or the y-axis in a horizontal zebra chart). In another embodiment, components 104 in a bar 102 are sorted so that components 104 with the smallest contribution to a bar 102 are furthest from the axis (e.g., the x-axis in a vertical zebra chart as in FIG. 1, or the y-axis in a horizontal zebra chart).

FIG. 1 illustrates an additional feature that is optionally found in the zebra charts of the present invention. This option is a component scaling option. This option is used in the zebra chart illustrated in FIG. 1. In FIG. 1, the length of each given component 104 in a bar 102 is proportional to the amount of contribution the given component 104 makes to the dimension represented by the bar (e.g., grouped customer name, sold to city, sold to state, sales person, sales territory, etc.) Thus, in FIG. 1, the positioning of a mouse cursor at the bottom of bar 104-N-4 reveals the biggest revenue contributors for that dimension (ship to state). Similarly, the positioning of a mouse cursor at the top of bar 104-N-4 shows the states that were the smallest revenue contributors. In embodiments where components 104 are not scaled, each component 104 in a bar 102 has a uniform size.

Figure 2:
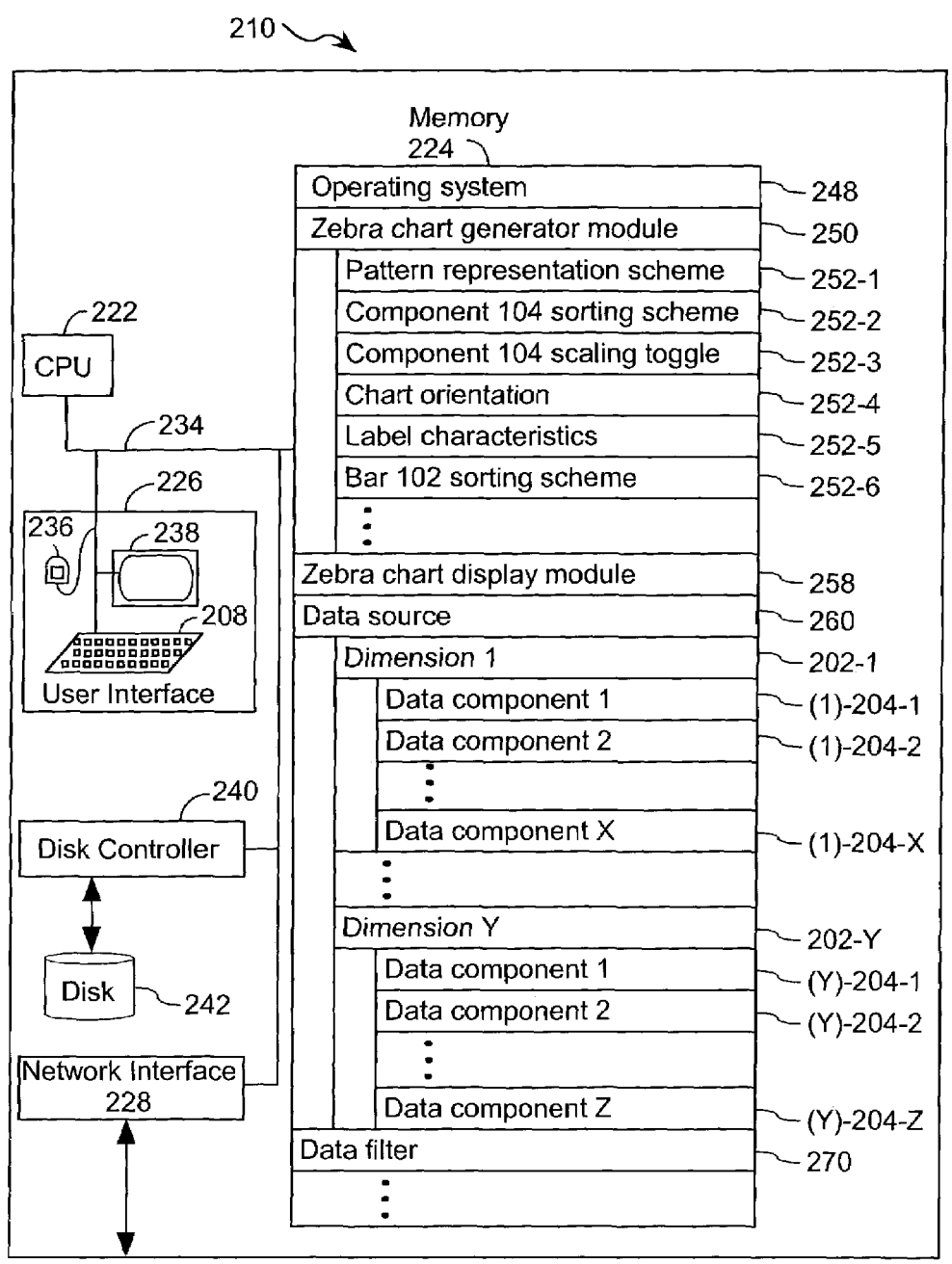
FIG. 2 illustrates an exemplary computer system in which the present invention may be implemented.

Now that zebra charts in accordance with some embodiments have been introduced, attention now turns to FIG. 2, which illustrates a computer system 210 capable of displaying zebra charts. Computer system 210 includes standard components including a central processing unit 222, memory 224 (including high speed random access memory) for storing program modules and data structures, user input/output device 226, an optional network interface 228 for coupling computer system 210 to other computers via a communication network (not shown), and one or more busses 234 that interconnect these components. User input/ output device 226 includes one or more user input/output components such as a mouse 236, display 238, and keyboard 208.

Memory 224 includes one or more modules and one or more data structures that are used in accordance with the present invention. It will be appreciated that at any one time during operation of system 210, a portion of the modules and/or data structures shown in FIG. 2 as being stored in memory 224 will be stored in random access memory while another portion of the modules and/or data structures will be stored in non-volatile storage 242. Non-volatile storage 242 is typically accessed using disk controller 240.

Memory 224 includes an operating system for performing basic system services such as input/output operations, process management, file management, and the like. In the embodiment illustrated in FIG. 2, memory 224 also includes a zebra chart generation module 250 for reading a data source 260 and generating a zebra chart based on parameters 252. The zebra chart comprises a plurality of bars and at least some of the bars (and typically all or most of the bars) in the plurality of bars comprises a plurality of linearly ordered components.

Parameter 252-1 describes the pattern representation scheme that will be used to pattern each component 104 in the zebra chart. Thus, parameter 252-1 indicates the interval number (e.g., 2, 3, 4, or more) that is used in the periodic patterning scheme that patterns each component 104 of each bar 102 of the zebra chart. Parameter 252-1 further indicates the patterns that are used to pattern components 104 of a zebra chart. In one example, parameter 252-1 indicates that the interval number is two. When this is the case, successive components 104 in each bar 102 in the zebra chart are alternately patterned. For example, each odd component 104 in a given bar 102 is patterned with a first pattern and each even component 104 in a give bar 102 is patterned with a second pattern. In this case, parameter 252-1 further specifies the two patterns that are to be used (e.g., a first color and a second color and/or a first hash pattern and a second hash pattern). In a second example, parameter 252-1 indicates that the interval number is three. In this second example, parameter 252-1 provides three unique patterns that are successively applied to components 104 in a bar 102.

Each bar 102 includes one or more components 104. Each component 104 represents a defined subset of the dimension represented by a bar 104. Parameter 252-2 specifies the criterion used to order components 104 of a bar 102. In one embodiment, parameter 252-2 specifies that components 104 in a bar 102 are sorted based on the criterion that components 104 with the smallest contribution (smallest magnitude) to a bar 102 are closest to the axis (e.g., the x-axis in a vertical zebra chart as depicted in FIG. 1, or the y-axis in a horizontal zebra chart). In another embodiment, components 104 in a bar 102 are sorted based on the criterion that components 104 with the smallest contribution (smallest magnitude) to a bar 102 are furthest from the axis (e.g., the x-axis in a vertical zebra chart as in FIG. 1, or the y-axis in a horizontal zebra chart). In some embodiments, chart display module 258 includes instructions for displaying the plurality of components in a bar in the chart based on the criterion specified by parameter 252-2 (FIG. 2).

Parameter 252-3 specifies whether an optional scaling option is used. When this option is enabled, the length of each component in each bar in the zebra chart is scaled based on the amount that the component contributes to the bar that the component is in. FIG. 1 illustrates an instance where this scaling option is used. In FIG. 1, the length of each given component 104 in a bar 102 is proportional to the amount of contribution the given component 104 makes to the dimension represented by the bar (e.g., grouped customer name, sold to city, sold to state, sales person, sales territory, etc.). For example, consider the case where a first component 104 (representing a first state) contributed 200 arbitrary units to the bar 102 representing "sold to state" and a second component 104 (representing a second state) contributed 100 arbitrary units to the same bar 104. In this case, the first component 104 would be scaled such that its length was twice as long as the second component. Thus, if the bar 102 representing "sold to state" was plotted vertically, the first component 104 would have a height that is twice that of the second component 104. In embodiments where parameter 252-3 indicates that components 104 are not to be scaled, each component 104 in a bar 102 has a uniform size.

Parameter 252-4 specifies the chart orientation (e.g., horizontal, vertical, etc.) for the zebra chart. FIG. 1 illustrates the case in which each bar 104 in the zebra chart is vertical. Hence, the chart orientation for the zebra chart illustrated in FIG. 1 is vertical. In instances where parameter 252-4 specifies a horizontal orientation, each bar 104 in the chart is plotted in a horizontal fashion (not shown). In addition to specifying a horizontal or vertical orientation, parameter 252-4 can specify a broad range of other orientations. For example, parameter 252-4 can specify a radial orientation in which each bar 104 radiates from one or more origins.

In some embodiments, chart display module 258 includes instructions for sensing when a cursor is overlaid on a component 104 of the zebra chart. For example, a user might use mouse 236 to overlay a mouse cursor (not shown) on a component 104 in a zebra chart displayed on display 238 (FIG. 2). When this occurs, chart display module 258 senses the event. In some embodiments, chart display module 258 includes instructions for displaying a label 110 corresponding to a component 104 when the cursor is overlaid on (e.g., passes over) the component.

Parameter 252-5 specifies label 110 (FIG. 1) characteristics, which are used by the chart display module 258 when displaying labels 110 on a zebra chart. For example, in one embodiment of the present invention, parameter 252-5 specifies how many milliseconds the cursor must suspend over a particular component 104 in a zebra chart before label 110 appears. In some embodiments, parameter 252-5 provides the option of specifying the point size and font used for the text in label 110 as well as the font color.

In some embodiments, the label 110 remains displayed even after the cursor is no longer displayed on the component. In this way, multiple labels 110 may be presented in a given zebra chart at the same time under the control of the chart display module 258. In such embodiments parameter 252-5 specifies how long a label may be displayed after the cursor no longer is suspended over the component 104 associated with the label. In some embodiments, parameter 252-5 provides for allowing the user to toggle a label 110 to stay displayed until further action is taken. In one example in accordance with this embodiment, a user displays a label for a component 104 by suspending the cursor of over the component. Once the label 110 is displayed, the user clicks on the label 110 with a mouse key while the cursor is suspended over either the component 104 or the label to keep the label permanently displayed. To remove the label 110, the user double clicks on either the label 110 or the component 104 associated with the label 110. In this way, multiple labels 110 can be turned on and off in a zebra chart based on user input that is mediated by parameter 252-5.

Parameter 252-6 determines the criterion used to order bars 102 in a given zebra chart. In some embodiments, parameter 252-6 is set so that the dimensions (bars 104) that form the biggest contribution to a particular measure (e.g., total revenue) are plotted first (e.g., closest to the y-axis in a vertical zebra chart and closest to the x-axis in a horizontal zebra chart). In some embodiments, chart generator module 250 comprises instructions for ordering the plurality of bars 102 in a zebra chart (based on the criterion or criteria set forth in parameter 252-6). Furthermore, in some embodiments, chart display module 258 includes instructions for displaying the plurality of bars 104 in the chart using this criteria or criterion.

The parameters 242 illustrated in memory 224 are merely illustrative. Not all embodiments of the present invention have each of the parameters shown in memory 224. Further, in some embodiments, each of the parameters 252 are hard coded into zebra chart generator module 250 (FIG. 2) and may not be adjusted by a user. The parameters 252 described in conjunction with system 210 were presented in order to present the possibilities and advantages the zebra charts of the present invention provide. Those of skill in the art will appreciate that a broad range of additional parameters and options may be associated with zebra chart generator module and all such options are included within the scope of the present invention.

In the embodiment illustrated in FIG. 2, memory 224 includes a zebra chart display module 258 for displaying a zebra chart that has been generated by zebra chart generator module 250 on an output device. Zebra chart generator module 250 is capable of outputting a zebra chart to a wide range of output devices, such as display 238, printers, and files. In some embodiments, zebra chart generator module 250 uses a display driver or printer driver that works in conjunction with operating system 248. Although zebra charts may be outputted to static streams, such as a printer or a file, many of the advantages of the zebra charts are best realized on interactive devices such as display 238 (FIG. 2). For example, on interactive devices, highly specific information can be presented by displaying a label 110 when a cursor is overlaid on a component 104 associated with the label.

The data used by zebra chart generator module 250 is stored in memory 224 as data source 260. In some embodiments, data source 260 is stored on a computer outside of system 210. In such embodiments, the data used by zebra chart generator module 250 to generate a zebra chart is obtained through a network using network interface 228 (FIG. 2).

In the embodiment illustrated in FIG. 2, data source 260 includes Y dimensions 202, where Y is some positive integer. Each dimension 202 corresponds to a bar 104 that is plotted in a zebra chart. Each dimension 202 includes one or more data components 204. For instance, dimension 202-1 includes data components (1)-204-1, (1)-204-2, ... (1)-204-X, and dimension 202-Y includes data components (Y)-204-1, (Y)-204-2, (Y)-204-Z, where X and Z are each independently some positive integer. Each data component 204 in data source 260 corresponds to a component 104 in a zebra chart.

It will be appreciated that the data structure illustrated in FIG. 2 is merely exemplary and that the data used to plot a zebra chart may adopt any of a number of different configurations. Furthermore, additional data may be stored in data source 260. For example, in some embodiments of the present invention, a unique data structure is associated with each data component 204. This unique data structure specifies the content of the label 110 (FIG. 1) that is displayed when a cursor (e.g., a mouse cursor) is positioned over the component 104 (FIG. 1) that corresponds to data component 204 (FIG. 2). Thus in one example, dimension 202-N-4 stores the value "Ship to State", component (N-4)-204-1 stores the value 13,960,930, and the unique data structure associated with data component (N-4)-204-1 specifies that the state is Georgia. Thus, when a cursor is positioned over the component 104 in the zebra chart that corresponds to data component (N-4)-204-1, the data structure associated with data component (N-4)-204-1 is used to determine the contents of the label 110 that is displayed (FIG. 1). In some embodiments, the unique data structure associated with each data component 204 stores a value, a label format, and label content.

Figure 3:
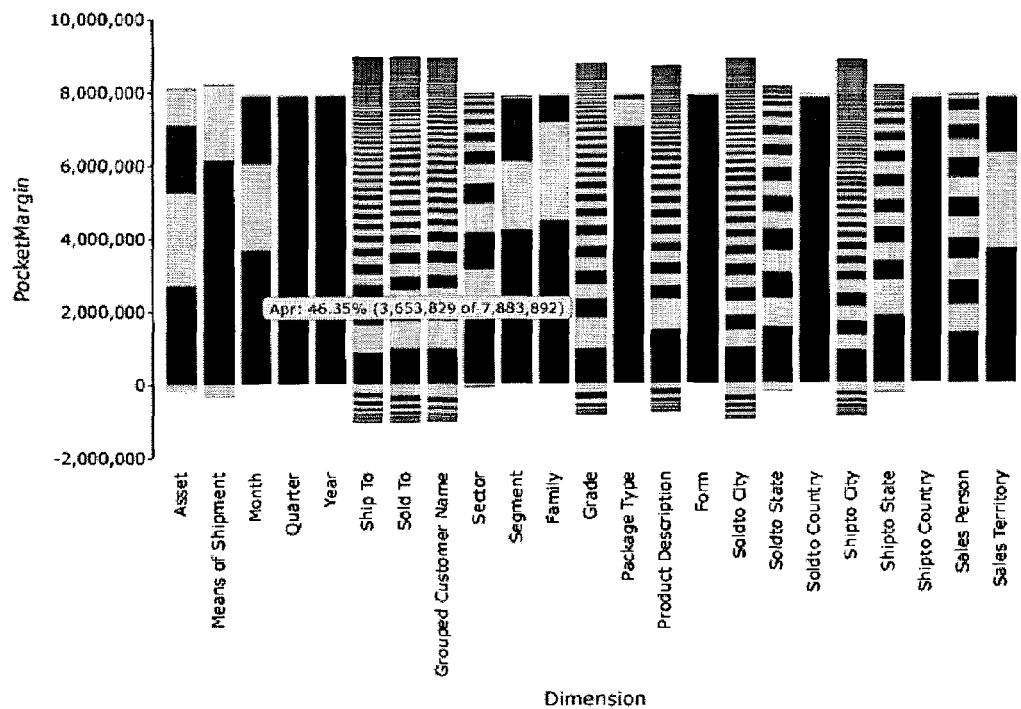
FIG. 3 illustrates an exemplary zebra chart in which both positive and negative values are displayed, in accordance with one embodiment of the present invention.

The zebra charts of the present invention can be used to display data that can range from positive to negative values. One example of such data is pocket margin, which typically assumes both positive (profit) and negative values (loss). To chart measures like these, the positive values are shown separately from the negative values. In the zebra chart illustrated in FIG. 3, the components 104 above the X-axis represent the positive values, and the components 104 below the X-axis represent the negative values. The representation illustrated in FIG. 3 allows for the quick determination of (i) the place or slice where the biggest profit was made, (ii) the place or slice where the least profit was made, (iii) the place or slice where the biggest loss occurred, and (iv) the place or slice where the least loss occurred. In this example, the positive components that contribute the most positively to each respective bar are closest to the axis of the zebra chart, and the negative components that contribute the most negatively to each respective bar are also closest to the axis of the zebra chart.

Since zebra charts sort components and arranges them linearly in the same chart for comparison, they can be used to quickly give an overview of how several measures were obtained in a given model. For example, in the accounting field, a zebra chart can be used to quickly display how several measures were obtained, including revenue, margin, sales discretion, discounts, freight, etc. Zebra charts therefore provide a method for rapidly determining complex issues, such as the distribution and usage of sales discretion discounts for a range of products sold by a business enterprise.

Figure 4:
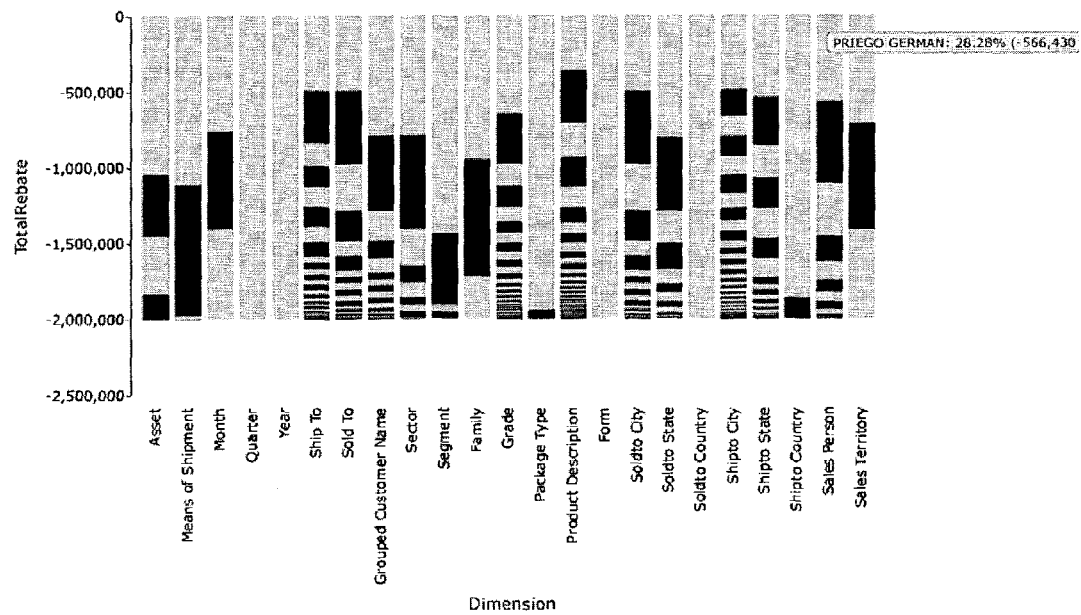
FIG. 4 illustrates an exemplary zebra chart in which all negative information associated with a component of the zebra chart is displayed, in accordance with one embodiment of the present invention.

FIG. 4 illustrates a zebra chart for rebates, where all the values are negative. These negative values indicate a payment or reduction in margin. In FIG. 4, the components 104 in each bar 102 are sorted by magnitude. However, in this example, the larger components 104 are located at the top of the zebra chart. When a cursor (e.g., mouse cursor) is moved over the component 104 associated with sales associate German Priego, the label 110 associated with German Priego shows that he issued 28.28% of all rebates issued by the sale staff in a given time period.

Zebra charts can be used to display a large amount of information. Accordingly, in some embodiments, zebra charts are best viewed on a computer screen in an interactive manner. There are typically many data points (e.g., customers or products). In such instances, usage of a color-based chart legend to distinguish components 104 is impractical. Rather than using a color-based chart legend to distinguish components 104, the present invention uses interactive labels 110 to show data related to components as a function of mouse cursor position, as describe above.

In some embodiments of the present invention, a data filter 270 (FIG. 2) can be applied to data source 260 before the chart is generated. To best explain the utility of data filter 270, consider the case in which data source 260 includes sales data for products in a product catalog that are sold by salespeople to customers. Rather than displaying all the data in data source 260 in a single zebra chart, it is possible to apply a data filter 270 data so that only particular forms of data are displayed. For example, a zebra chart can be drawn to represent a particular customer, product, sales person, etc., or any combination thereof. Furthermore, in some embodiments, data filter 270 is reapplied against data source 260 with successively narrow criteria. Reapplication of data filter 270 with successively narrow criteria allows for "drilling" into a data source 260 in order to derive a zebra chart that includes very specific data.

In some embodiments, data filter 270 is applied against data source 260 in a manner such that the zebra chart depicts the difference of a measure between two time periods represented by the data source. In one example, in accordance with such an application of data filter 270, a zebra chart shows which dimensions (bars 104) are responsible for an increase in revenue in one time period, relative to an earlier time period. To plot such a zebra chart, dimensions for a first time period are identified (e.g., salesperson sales during time period one, ship to state during time period one, ship to city during time period one). Next, corresponding dimensions for a second time period are identified (e.g., salesperson sales during time period two, ship to state during time period two, ship to city during time period two). The zebra chart then plots the difference between corresponding components in each of the identified dimensions. Thus, consider the case in which the dimension "ship to state during time period one" has the following components:

| | |
|---|---|
| Georgia | $5000.00 |
| California | $8000.00 |

And the dimension "ship to state during time period two" has the following components:

| | |
|---|---|
| Georgia | $6000.00 |
| California | $3000.00 |

In this case, the dimension "ship to state" will have the following components:

| | | |
|---|---|---|
| Georgia | $1000.00 | ($6000.00 − 5000.00) |
| California | −$5000.00 | ($3000.00 − $8000.00) |

A plot of this data in the zebra chart format will quickly show that sales to California did not contribute to an anticipated sales increase in time period 2 (as exhibited by the negative number) whereas sales to Georgia did. Similarly, several different dimensions can be computed and each of these dimensions can be plotted in the same zebra chart in order to quickly identify which components of which bars changed the most in any two given time periods. Furthermore, bars 104 can be sorted, by chart generator module 250, such that bars 104 (dimensions) that have the most significant changes are plotted first or last. In this way, dimensions that changed the most between the two time periods can be rapidly identified.

ALTERNATE EMBODIMENTS

The present invention can be implemented as a computer program product that includes a computer program mechanism embedded in a computer readable storage medium. For instance, the computer program product could contain the program modules shown in FIG. 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer program product for use in conjunction with a computer system, the computer program product comprising a computer readable storage medium and a computer program mechanism embedded therein, the computer program mechanism comprising:

a zebra chart generator module, the chart generator module including
  instructions for reading a data source, and
  instructions for generating a zebra chart, wherein said zebra chart comprises a plurality of bars and at least two of the bars in said plurality of bars comprise a plurality of linearly ordered components, wherein a negative component in a bar in the zebra chart that contributes the most negatively to said bar is closest to an axis of the zebra chart, wherein each of said at least two bars have a different number of said plurality of linearly order components, and wherein said at least two bars represent at least two different dimensions, said at least two different dimensions including at least two of a product dimension, a customer dimension, a time dimension, a geographic dimension, a shipping dimension and a sales dimension; and a zebra chart display module, the zebra chart display module including
  instructions for displaying said zebra chart on an output device, wherein, for each of said at least two of the bars in said plurality of bars, each component in said bar in the zebra chart is depicted in a pattern that differs from components in the bar that border the component.

2. The computer program product of claim 1 wherein each odd component in said plurality of components in a bar in said chart is displayed in a first pattern and each even component in said plurality of components in said bar is displayed in a second pattern, wherein said first pattern and said second pattern are different.

3. The computer program product of claim 2 wherein said first pattern is solid shading in a first color and said second pattern is solid shading in a second color.

4. The computer program product of claim 2 wherein said first pattern is a first hash pattern and said second pattern is a second hash pattern.

5. The computer program product of claim 1 wherein
each (1+3×Y) component in said plurality of components in a bar in said chart is displayed in a first pattern;
each (2+3×Y) component in said plurality of components in said bar is displayed in a second pattern; and
each (3+3×Y) component in said plurality of components in said bar is displayed in a third pattern; wherein
Y is zero or a positive integer and each of said first pattern, said second pattern and said third pattern is different.

6. The computer program product of claim 5 wherein said first pattern is solid shading in a first color, said second pattern is solid shading in a second color, and said third pattern is solid shading in a third color.

7. The computer program product of claim 1 wherein, for each integer s in a set S,
each s+M×Y component in the plurality of components in a bar in said chart is displayed in an $s^{th}$ pattern, wherein said $s^{th}$ pattern is different from any other pattern used in the display of a component is said bar, and wherein the set S consists of the integers 1 to M,
Y has a value of zero or any positive integer, and
M has a value of two or greater.

8. The computer program product of claim 1, wherein,
said chart generator module comprises instructions for ordering the plurality of components in a bar in said chart based on a criterion; and
said chart display module comprises instructions for displaying the plurality of components in said bar in said chart based on said ordering.

9. The computer program product of claim 8 wherein said criterion is a magnitude associated with each component in the plurality of components.

10. The computer program product of claim 1 wherein, for each component in a plurality of components in a bar in said chart, said chart generator module comprises instructions for scaling a length of the component based on an amount that said component contributes to said bar.

11. The computer program product of claim 1 wherein a component in a bar in the chart that contributes the most to a bar is closest to an axis of the chart.

12. The computer program product of claim 1 wherein said chart display module comprises instructions for displaying said plurality of bars in a horizontal fashion or a vertical fashion on said output device.

13. The computer program product of claim 1 wherein said chart display module comprises:
instructions for sensing when a cursor is overlaid on a component in said chart; and
instructions for displaying a label associated with said component when said cursor is overlaid on said component.

14. The computer program product of claim 1, wherein,
said chart generator module comprises instructions for ordering the plurality of bars in said chart using a criterion; and
said chart display module comprises instructions for displaying the plurality of bars in said chart using said ordering.

15. The computer program product of claim 1, wherein at least one component in a plurality of components in a bar in said chart has a positive value and at least one component in said plurality of components in said bar has a negative value, and
said display module comprises instructions for displaying each component in said bar that has a positive value on a first side of an axis in said chart and each component in said bar that has a negative value on a second side of said axis.

16. The computer program product of claim 1 further comprising said data source.

17. A computer system for plotting a chart, the computer system comprising:
a central processing unit;
an output device;
a memory, coupled to the central processing unit, the memory storing a data source, the data source including a plurality of dimensions and each dimension having a plurality of components;
a zebra chart generator module, executable by the central processing unit, the chart generator module including
instructions for reading said data source, and
instructions for generating said zebra chart, wherein said chart comprises a plurality of bars and at least two bars in said plurality of bars comprise a plurality of linearly ordered components, wherein each of said at least two bars have a different number of said plurality of linearly order components, wherein a negative component in a bar in the zebra chart that contributes the most negatively to said bar is closest to an axis of the zebra chart, and wherein said at least two bars represent at least two different dimensions, said at least two different dimensions including at least two of a product dimension, a customer dimension, a time dimension, a geographic dimension, a shipping dimension and a sales dimension; and
a zebra chart display module, executable by the central processing unit, the chart display module including
instructions for displaying said zebra chart on said output device, wherein, for each bar in said at least two bars in said plurality of bars, each component in said bar in the zebra chart is depicted in a pattern that differs from components in the bar that border the component.

18. A computer program product for use in conjunction with a computer system, the computer program product comprising a computer readable storage medium and a computer program mechanism embedded therein, the computer program mechanism comprising:
a zebra chart generator module, the chart generator module including
instructions for reading a data source, and
instructions for generating a zebra chart, wherein said chart comprises a plurality of bars and at least one bar of said plurality of bars comprise a plurality of linearly ordered components, wherein a positive component of the at least one bar that contributes the most positively to the at least one bar is closest to an axis of the zebra chart; and wherein a negative component of the at least one bar in the zebra chart that contributes the most negatively to the bar is closest to the axis of the zebra chart; and
a zebra chart display module, the chart display module including
instructions for displaying said zebra chart on an output device, wherein each component in said at least one bar in the zebra chart is depicted in a pattern that differs from components in the at least one bar that border the component.

19. The computer program product of claim 13 wherein said label shows a relative value of the component and an absolute value of the component.

* * * * *